United States Patent
Anscher

[19]

[11] Patent Number: 5,940,944
[45] Date of Patent: Aug. 24, 1999

[54] STRAP RETAINER

[75] Inventor: Joseph Anscher, Muttontown, N.Y.

[73] Assignee: National Molding Corporation, Farmingdale, N.Y.

[21] Appl. No.: 09/205,971

[22] Filed: Dec. 4, 1998

[51] Int. Cl.$^6$ .................................................. A44B 21/00
[52] U.S. Cl. ................ 24/598.2; 24/16 PB; 24/265 AL; 24/573.5
[58] Field of Search ............................... 24/598.2, 573.5, 24/16 PB, 265 AL, 335, 339; 70/457

[56] References Cited

U.S. PATENT DOCUMENTS

| | | | |
|---|---|---|---|
| 3,517,702 | 6/1970 | Mueller et al. | 24/16 PB |
| 4,220,301 | 9/1980 | Jacobs et al. | 24/16 PB |
| 5,263,726 | 11/1993 | Wood | 280/33.992 |
| 5,333,361 | 8/1994 | Schaede | 24/16 PB |
| 5,423,831 | 6/1995 | Nates | 24/598.2 |
| 5,669,118 | 9/1997 | Frano et al. | |
| 5,781,970 | 7/1998 | Anscher. | |

Primary Examiner—Victor N. Sakran
Attorney, Agent, or Firm—Collard & Roe, P.C.

[57] ABSTRACT

A strap retainer comprising a flexible elongated body having two planar sides and two free ends adapted for closure on to each other. A locking pawl is integrally formed with one free end and comprises a post and a head section having two locking legs. A receptacle for the locking pawl is integrally formed with the other free end. The receptacle has top and bottom surfaces that are parallel to the planar sides of the body. There is a cavity in the top surface of the receptacle, having an enlarged section and a narrow section extending through the free end of the receptacle. There are two apertures on either side of the narrow section that extend toward the free end. Inserting the locking pawl into the cavity and sliding it toward the free end of the receptacle causes the legs to snap into the apertures and lock the locking pawl into the receptacle, to permanently close the strap retainer.

3 Claims, 4 Drawing Sheets

STRAP RETAINER

BACKGROUND OF THE INVENTION

1. Field of the Invention

This invention relates to a novel retainer for straps. In particular, the invention relates to a locking ring for straps used as seat belts for infants and small children in shopping carts or other vehicles.

2. The Prior Art

Shopping carts are often equipped with safety belts for securing a child in the seating area. The belts are typically a length of nylon webbing that is secured to the cart with a metal or plastic D-ring.

One such device is shown in U.S. Pat. No. 5,669,118 to Frano et al. This patent discloses a strap retainer in the form of a locking D-ring. The ring comprises a straight post and an integrally-formed arcuate retainer element that is snapped on to the post to lock the ring closed. The locking element comprises a protruding nail-like head on the post that slips into a keyhole shaped aperture in the arcuate retainer element.

Many manufacturers of child seat belts prefer to ship the belts with the strap retainers attached, for easy assembly onto the shopping carts at their destination point. The disadvantage of using the prior art strap retainer is that the strap can easily slide off of the open post during shipping. This would result in an unnecessary expenditure of time and effort reassembling the straps and retainers at their destination point.

Another disadvantage of the prior art strap retainer is its inability to withstand high amounts of tension. The locking elements are arranged at a 90° angle to the direction of force on the ring. This creates the risk that the locking elements, especially the nail-like head on the post, will break under high amounts of stress.

A solution to this problem was proposed by U.S. Pat. No. 5,781,970 to Anscher. This strap retainer comprises a triangular body having the locking elements arranged along the middle of one leg of the triangle. The locking elements are disposed at 180° to each other, so that the direction of force is along the longitudinal axis of the locking elements. The locking elements are comprised of a locking pawl that slides into a receptacle and is locked in place by a locking tooth on the bottom of the receptacle. While this arrangement leads to an exceptionally strong strap retainer when used in a normal way, this strap retainer is unable to withstand unusual twisting and torque, which may occur when shopping carts are smashed together as they are being collected. Placing a twisting force onto the locked retainer can cause the locking pawl to become disengaged from the receptacle and free the strap from the shopping cart.

SUMMARY OF THE INVENTION

It is therefore an object of the present invention to provide a strap retainer that will withstand stresses from every angle.

It is yet another object of the present invention to provide a strap retainer that is simple and inexpensive to manufacture.

These and other objects are achieved by a strap retainer comprising a flexible elongated body having two ends that can be locked onto each other to form a closed loop for holding a strap. The retainer has two planar sides and in a preferred embodiment, is a generally triangular shape formed by a first leg, a second leg and a third leg. The third leg is separated from the first leg to form an opening for insertion of a strap. A locking pawl is integrally formed with one end of the body. The locking pawl is comprised of a post attached to one end of the body, and an enlarged head section forming a free end. Two hooked legs extend back from the head section.

A receptacle for the locking pawl is integrally formed with the other end of the elongated body and extends generally parallel to the second leg. The top and bottom surfaces of the receptacle are parallel to the planar sides of the body. The receptacle has a cavity in the top surface that extends down to, but not though, the bottom surface. The cavity has an enlarged section corresponding to the head of the locking pawl and a narrow section extending through the free end of the receptacle, which corresponds to the post of the locking pawl. There are two apertures disposed on either side of the narrow section for accommodating the legs of the locking pawl.

To lock the strap retainer, the locking pawl is inserted into the cavity in the receptacle and slid toward the narrow portion of the receptacle. At this point, the legs of the locking pawl snap into the apertures on either side of the narrow portion and lock the strap retainer in a closed position. The strap retainer cannot become unlocked even under high stresses from any angle.

To facilitate locking of the locking pawl within the receptacle, the locking pawl preferably has outwardly-extending hooks on the end of each of the legs. The receptacle is also preferably equipped with a protruding flange on the inner surface of the side walls of the receptacle and extending into each aperture. The hooks are compressed as the locking pawl is slid into the apertures around the protruding flanges and then expand again as the hooks pass the flanges. The flanges prevent the locking pawl from exiting from the receptacle by holding the hooks in the apertures.

The strap retainer can be made out of any suitable material, but is preferably polypropylene, acetal or nylon. The strap retainer must be sufficiently flexible to be bent into the locking shape, but must also be sufficiently rigid and durable to withstand high amounts of tension. Preferably, the strap retainer is sufficiently rigid so that its shape is not deformed after the ends are locked together, even under high amounts of tension.

One way to accomplish the required balance of strength and flexibility is to form the body with several apertures therethrough, into a honeycomb shape. This shape prevents cracking of the entire body if one section is overly distressed, and lends additional flexibility to the body.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
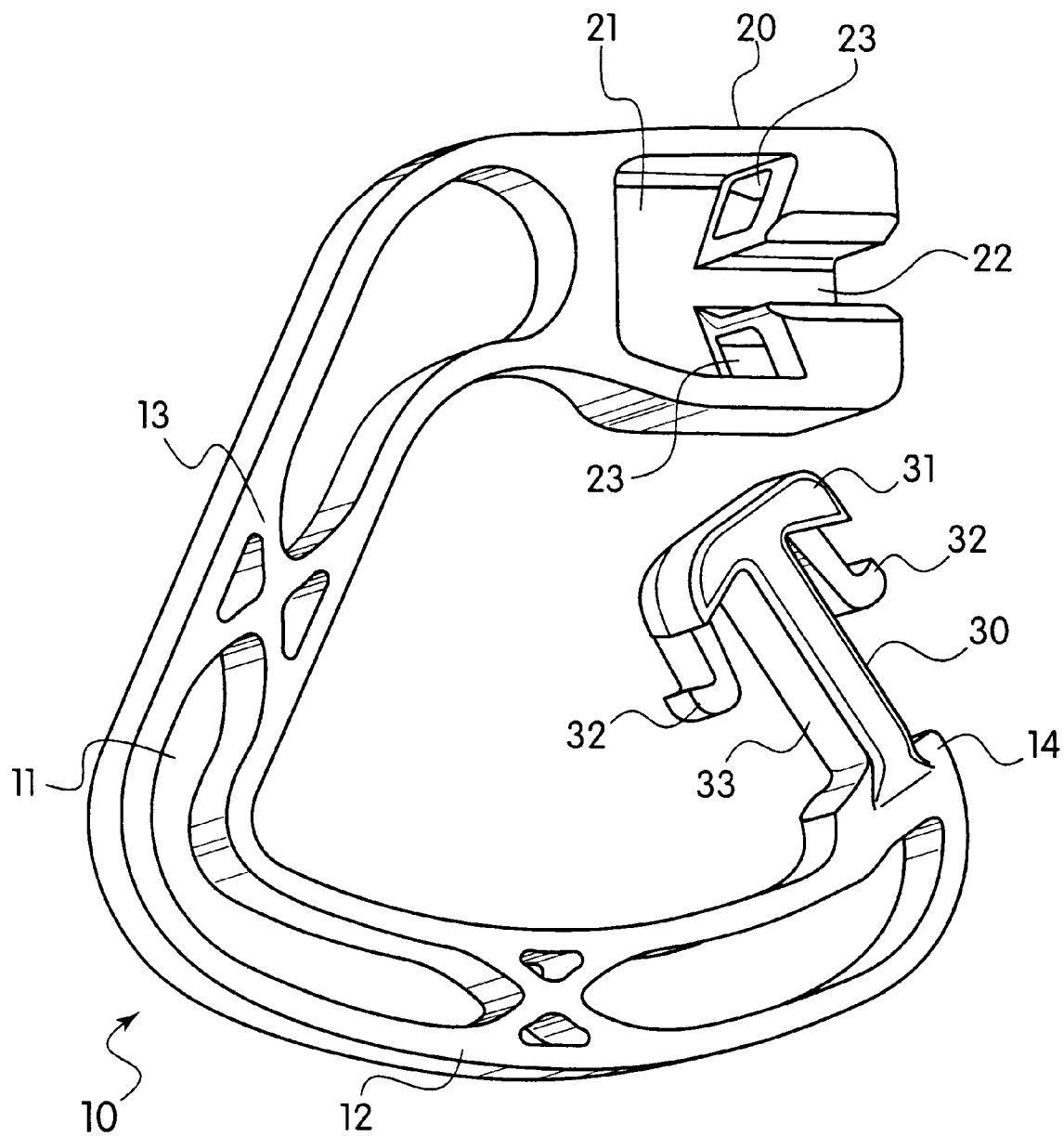
FIG. 1 shows a perspective view of the strap retainer according to the invention.

Referring now in detail to the drawings and, in particular, FIGS. 1–7, there are shown several views of the strap retainer according to the invention. Strap retainer 10 is formed into a generally triangular shape with two planar sides, having legs 12, 13 and 14 integrally formed together. Leg 14 is separated from leg 13 so that there are two free ends and an opening for insertion of a strap. A plurality of apertures 11 are formed in the body of strap retainer 10 to allow for additional strength and flexibility.

On the end of leg 14 is a locking pawl 30. Locking pawl 30 has a head section 31 and a post 33 attached to the end of leg 14. There are two hooked legs 32 extending from head section 31.

Figure 2:
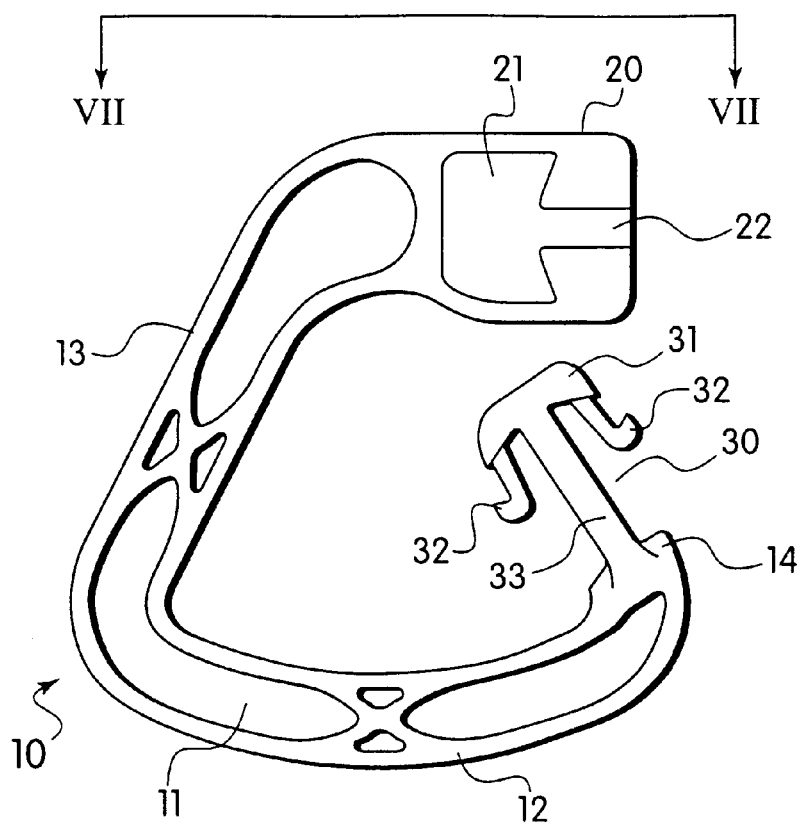
FIG. 2 shows a top view of the strap retainer according to the invention.

Extending from the end of leg 13 is a receptacle 20 having a cavity 21 formed therein. Cavity 21 opens in a plane parallel to the planar sides of strap retainer 10. Cavity 21 extends through the free end of receptacle 20, as shown in FIGS. 1 and 2.

Figure 3:
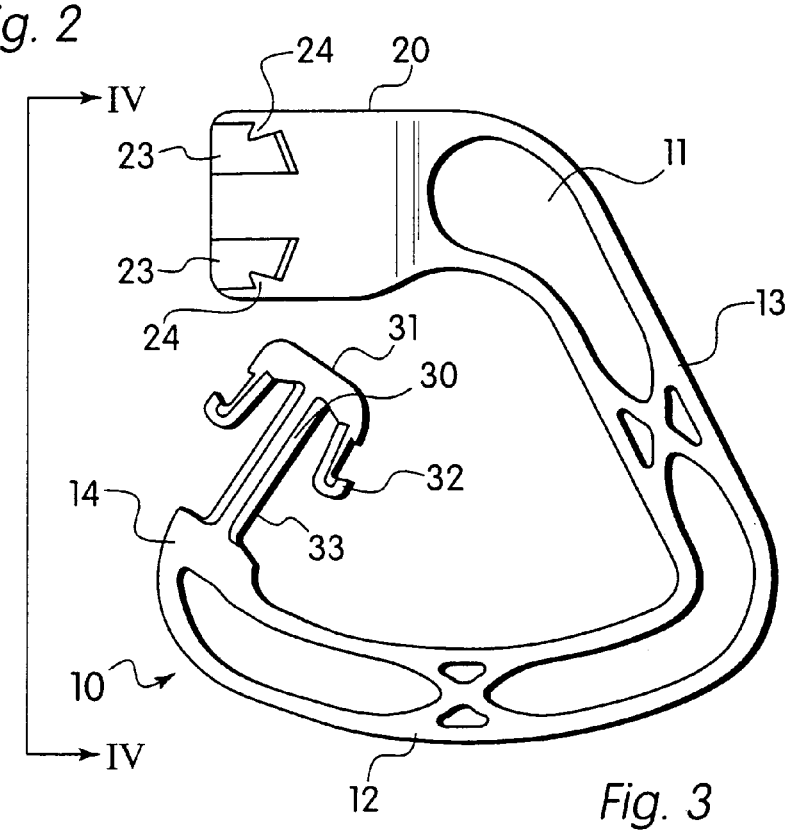
FIG. 3 shows bottom view of the strap retainer.
Figure 4:
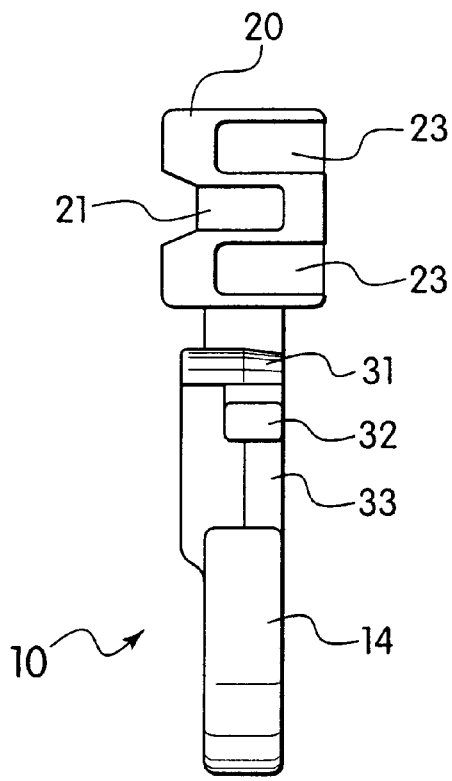
FIG. 4 shows a side view along lines IV—IV of FIG. 2.
Figure 5:
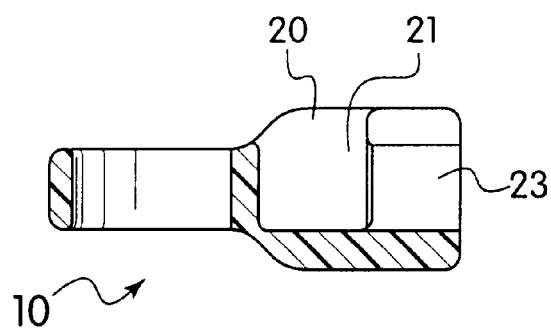
FIG. 5 shows a cross-sectional view of the locking receptacle of the strap retainer according to the invention.
Figure 6:
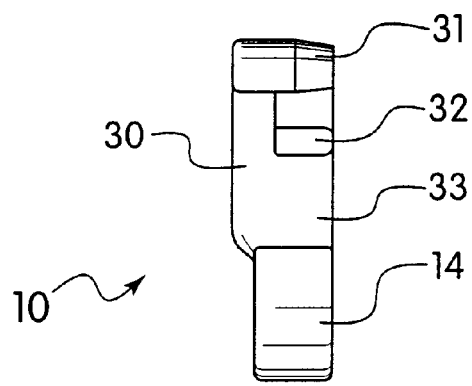
FIG. 6 shows a side view of the locking pawl according to the present invention.

Cavity 21 has two apertures 23 that extend through the free end of receptacle 20, as shown in FIGS. 3 and 4. Apertures 23 have a protruding ledge 24 for catching hooked legs 32 when they are inserted into apertures 23.

Strap retainer 10 can be shipped to a shopping cart manufacturer or supermarket in an unlocked position with a safety belt formed from a length of webbing already threaded therethrough. The triangular shape of strap retainer 10 keeps a loop of webbing from inadvertently sliding off of the retainer, even when the retainer is in an unlocked position.

Figure 7:
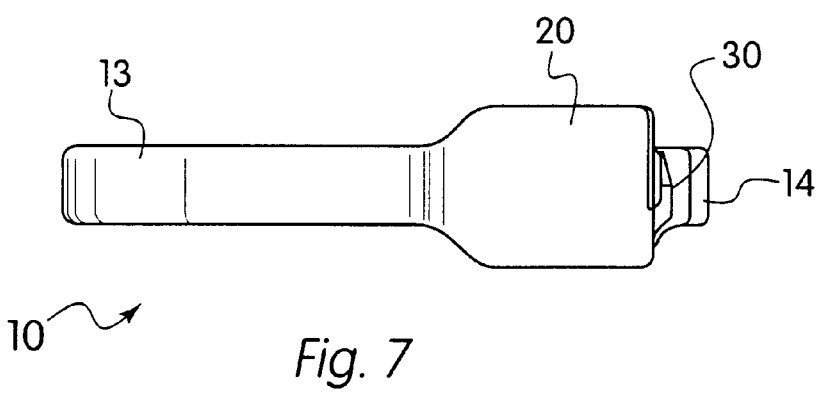
FIG. 7 shows a side view along lines VII—VII of FIG. 2.
Figure 8:
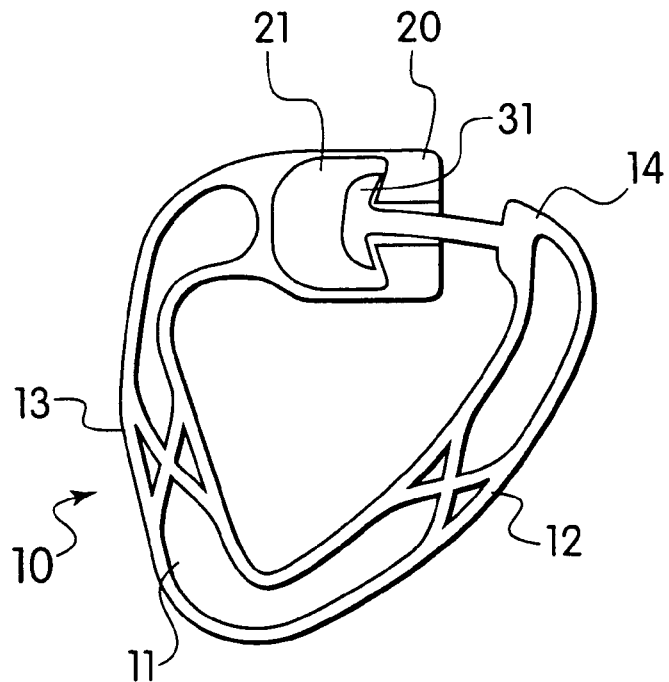
FIG. 8 shows a top view of the strap retainer according to the invention in a locked position.
Figure 9:
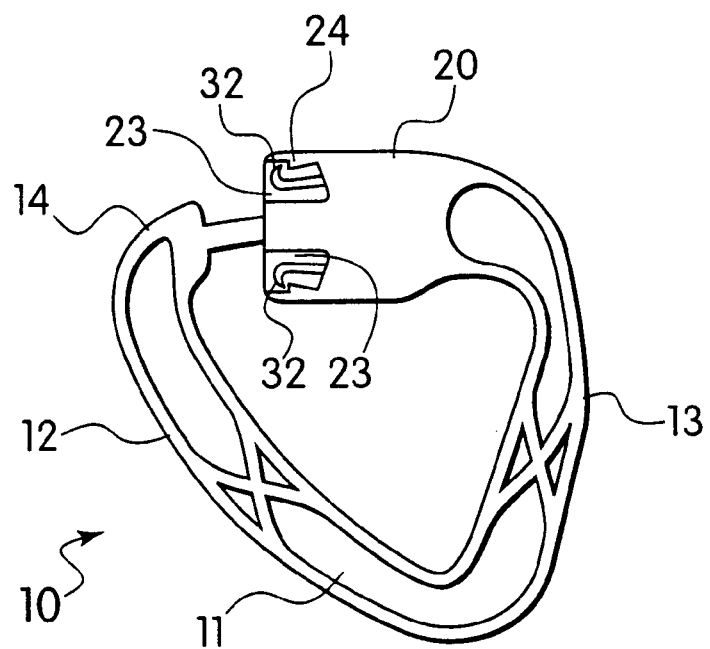
FIG. 9 shows a bottom view of the strap retainer according to the invention in a locked position.

Locking strap retainer 10 proceeds as follows: Locking pawl 30 is brought into an aligned position above cavity 21 of receptacle 20 by bending strap retainer 10 into a desired position. Then, as shown in FIG. 7, locking pawl 30 is forced downward into cavity 21 and pulled toward the free end of receptacle 20. At this point, legs 32 slide within apertures 23 and catch on protruding ledges 24 to lock strap retainer 10 closed, as shown in FIGS. 8 and 9.

The specific locking arrangement of the present invention provides a much stronger strap retainer than those shown in the prior art. This is due to the placement of the opening of cavity 21 in a plane parallel to the planar sides of the clip body and the locking of legs 32 within apertures 23. This arrangement ensures that tension on the clip body from a strap or belt inserted through the strap retainer is not exerted perpendicular to the opening, but rather parallel to it, and also that any twisting or torquing stresses cannot disengage the locking pawl from the receptacle.

Accordingly, while only a single embodiment of the present invention has been shown and described, it is obvious that many changes and modifications may be made thereunto without departing from the spirit and scope of the invention.

What is claimed is:

1. A strap retainer comprising:

a flexible elongated body having two planar sides, a first end and a second end adapted for closure onto said first end;

a locking pawl comprising a head section having two locking legs, said head section being connected to said first end by a post and said locking pawl having a top surface and a bottom surface;

a receptacle for the locking pawl integrally formed with the second end, said receptacle having a free end, a top surface and a bottom surface, said top and bottom surfaces being in planes parallel to the planar sides of the body, and comprising:

(a) a cavity in the top surface of the receptacle, said cavity having an enlarged section and a narrow section extending through the free end of the receptacle, said narrow section being narrower than the head section of the locking pawl; and two apertures disposed one on either side of the narrow section and extending toward the free end of the receptacle; and means for retaining the locking legs within the apertures when said locking legs are slid within the apertures, wherein inserting the locking pawl into the cavity through the insertion and sliding the locking pawl toward the free end of the receptacle causes the locking legs to lock into the apertures and lock the locking pawl into the receptacle.

2. The strap retainer according to claim 1, wherein the locking legs each have an outwardly-extending foot portion.

3. The strap retainer according to claim 2, wherein the means for retaining the locking legs within the apertures comprises a protruding flange arranged on each side wall of the receptacle within each aperture, said flange catching the foot portion of the locking legs when said locking legs are slid within the apertures and preventing the locking legs fro sliding out of the apertures.

* * * * *